(12) United States Patent
Huang et al.

(10) Patent No.: US 10,244,555 B2
(45) Date of Patent: Mar. 26, 2019

(54) CO-EXISTENCE FOR SPATIAL REUSE IN WIRELESS LOCAL AREA NETWORKS

(71) Applicant: Intel IP Corporation, Santa Clara, CA (US)

(72) Inventors: Po-Kai Huang, San Jose, CA (US); Laurent Cariou, Portland, OR (US); Robert J. Stacey, Portland, OR (US); Chittabrata Ghosh, Fremont, CA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/890,792

(22) Filed: Feb. 7, 2018

(65) Prior Publication Data

US 2018/0213565 A1    Jul. 26, 2018

Related U.S. Application Data

(63) Continuation of application No. 14/972,541, filed on Dec. 17, 2015, now Pat. No. 9,924,540.

(60) Provisional application No. 62/215,523, filed on Sep. 8, 2015.

(51) Int. Cl.
*H04W 74/08* (2009.01)
(52) U.S. Cl.
CPC ............... *H04W 74/0808* (2013.01)
(58) Field of Classification Search
CPC .............................................. H04W 74/0808
See application file for complete search history.

(56) References Cited

U.S. PATENT DOCUMENTS

| | | | |
|---|---|---|---|
| 9,924,540 B2 | 3/2018 | Huang et al. | |
| 2013/0235737 A1 | 9/2013 | Merlin et al. | |
| 2014/0286203 A1 | 9/2014 | Jindal et al. | |
| 2015/0282043 A1 | 10/2015 | Fang et al. | |
| 2016/0135225 A1* | 5/2016 | Kwon ............... | H04W 74/0808 370/329 |
| 2016/0301491 A1 | 10/2016 | Porat et al. | |
| 2016/0374009 A1 | 12/2016 | Hiertz et al. | |
| 2016/0374087 A1* | 12/2016 | Liu ................... | H04W 74/0808 |

(Continued)

OTHER PUBLICATIONS

"U.S. Appl. No. 14/972,541, Examiner Interview Summary dated Aug. 3, 2017", 3 pgs.

(Continued)

*Primary Examiner* — Duc C Ho
(74) *Attorney, Agent, or Firm* — Schwegman Lundberg & Woessner, P.A.

(57) ABSTRACT

An apparatus of a first high-efficiency (HE) access point (AP) or station for spatial reuse is the disclosed. The apparatus includes processing circuitry configured to: decode a first portion of a first packet; and if the first portion indicates the first packet was transmitted by a second HE AP or station and that the first packet is an overlapping basic service set (OBSS) packet, then if a preamble detect energy is below a threshold, cause to be transmitted a second packet simultaneously with a portion of the first packet after the first portion. The processing circuitry may be configured to determine the first portion was transmitted by the second HE AP or station if a field in a physical (PHY) header or a second field in a media access control (MAC) header indicate the first packet was transmitted by the second HE AP or station.

20 Claims, 13 Drawing Sheets

(56) References Cited

U.S. PATENT DOCUMENTS

2016/0381688 A1    12/2016  Hedayat
2017/0071009 A1     3/2017  Huang et al.
2017/0230981 A1*    8/2017  Ryu ..................... H04W 74/00
2017/0289987 A1*   10/2017  Seok ................. H04W 72/0406

OTHER PUBLICATIONS

"U.S. Appl. No. 14/972,541, Non Final Office Action dated Jun. 29, 2017", 7 pgs.
"U.S. Appl. No. 14/972,541, Notice of Allowance dated Nov. 7, 2017", 8 pgs.
"U.S. Appl. No. 14/972,541, Response filed Sep. 29, 2017 to Non Final Office Action dated Jun. 29, 2017", 12 pgs.

* cited by examiner

CO-EXISTENCE FOR SPATIAL REUSE IN WIRELESS LOCAL AREA NETWORKS

PRIORITY CLAIM

This application is a continuation of U.S. patent application Ser. No. 14/972,541, filed Dec. 17, 2015, now issued as U.S. Pat. No. 9,924,540, which claims the benefit of priority under 35 USC 119(e) to U.S. Provisional Patent Application Ser. No. 62/215,523, filed Sep. 8, 2015, each of which is incorporated herein by reference in their entirety.

TECHNICAL FIELD

Embodiments pertain to wireless communications in a wireless local-area network (WLAN). Some embodiments relate to spatial reuse. Some embodiments relate to determining when to perform spatial reuse. Some embodiments relate to Institute of Electrical and Electronic Engineers (IEEE) 802.11 and some embodiments relate to IEEE 802.11ax.

BACKGROUND

Users of wireless networks often demand more bandwidth and faster response times. However, the available bandwidth may be limited. Moreover, there are more and more wireless devices operating close to one another. Additionally, wireless devices may operate with different communication standards.

BRIEF DESCRIPTION OF THE DRAWINGS

The present disclosure is illustrated by way of example and not limitation in the figures of the accompanying drawings, in which like references indicate similar elements and in which.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
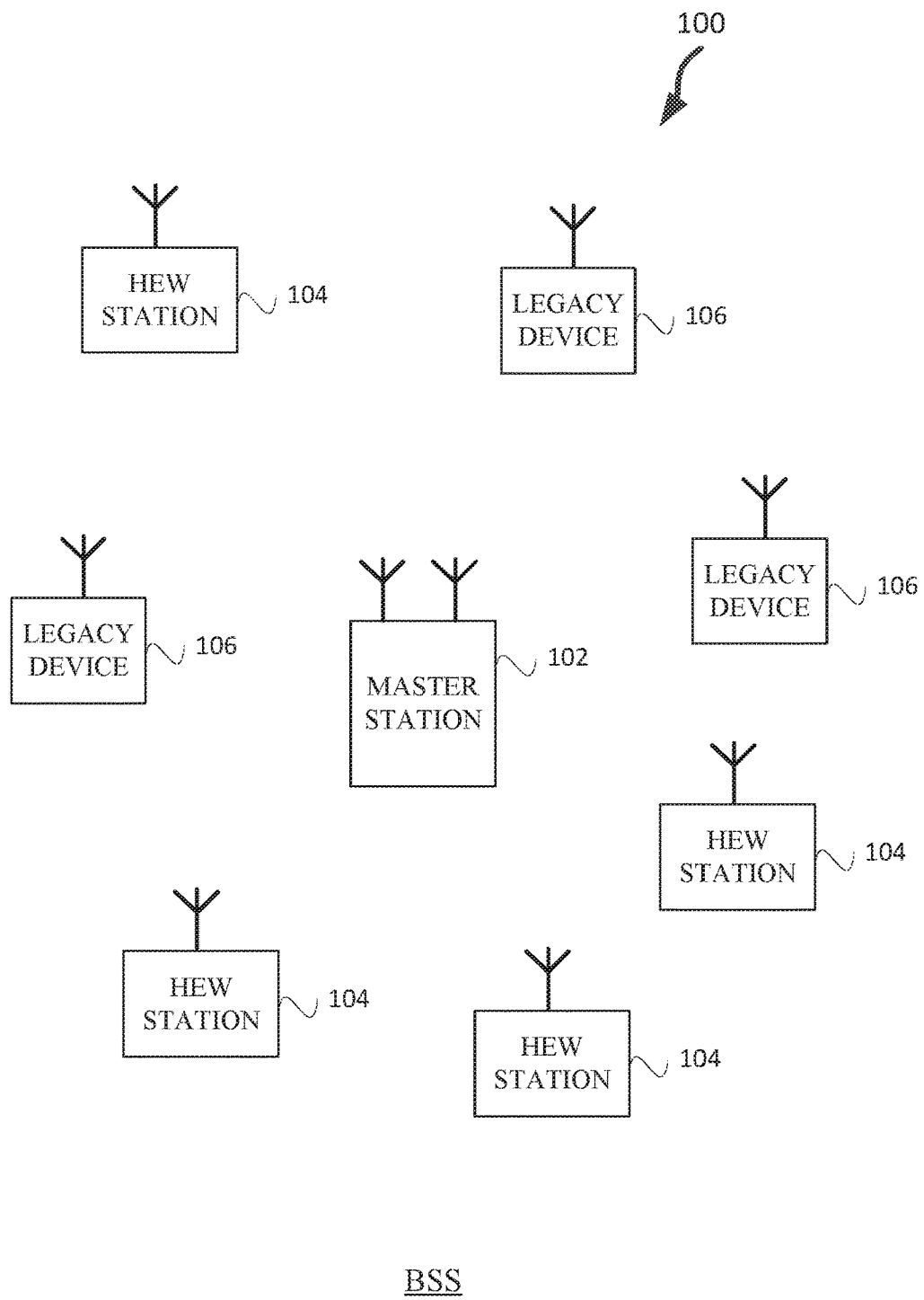
FIG. 1 illustrates a WLAN in accordance with some embodiments.

FIG. 1 illustrates a WLAN 100 in accordance with some embodiments. The WLAN may comprise a basis service set (BSS) 100 that may include a master station 102, which may be an AP, a plurality of high-efficiency wireless (HEW) (e.g., IEEE 802.11ax) STAs 104 and a plurality of legacy (e.g., IEEE 802.11n/ac) devices 106.

The master station 102 may be an AP using the IEEE 802.11 to transmit and receive. The master station 102 may be a base station. The master station 102 may use other communications protocols as well as the IEEE 802.11 protocol. The IEEE 802.11 protocol may be IEEE 802.11ax. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO).

The legacy devices 106 may operate in accordance with one or more of IEEE 802.11 a/b/g/n/ac/ad/af/ah/aj, or another legacy wireless communication standard. The legacy devices 106 may be STAs or IEEE STAs. The HEW STAs 104 may be wireless transmit and receive devices such as cellular telephone, smart telephone, handheld wireless device, wireless glasses, wireless watch, wireless personal device, tablet, or another device that may be transmitting and receiving using the IEEE 802.11 protocol such as IEEE 802.11ax or another wireless protocol. In some embodiments, the HEW STAs 104 may be termed high efficiency (HE) stations.

The master station 102 may communicate with legacy devices 106 in accordance with legacy IEEE 802.11 communication techniques. In example embodiments, the master station 102 may also be configured to communicate with HEW STAs 104 in accordance with legacy IEEE 802.11 communication techniques.

In some embodiments, a HEW frame may be configurable to have the same bandwidth as a subchannel. The bandwidth of a subchannel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a subchannel may be 1 MHz, 1.25 MHz, 2.03 MHz, 2.5 MHz, 5 MHz and 10 MHz, or a combination thereof or another bandwidth that is less or equal to the available bandwidth may also be used. In some embodiments the bandwidth of the subchannels may be based on a number of active subcarriers. In some embodiments the bandwidth of the subchannels are multiples of 26 (e.g., 26, 52, 104, etc.) active subcarriers or tones that are spaced by 20 MHz. In some embodiments the bandwidth of the subchannels is 256 tones spaced by 20 MHz. In some embodiments the subchannels are multiple of 26 tones or a multiple of 20 MHz. In some embodiments a 20 MHz subchannel may comprise 256 tones for a 256 point Fast Fourier Transform (FFT).

A HEW frame may be configured for transmitting a number of spatial streams, which may be in accordance with MU-MIMO. In other embodiments, the master station 102, HEW STA 104, and/or legacy device 106 may also implement different technologies such as code division multiple access (CDMA) 2000, CDMA 2000 1×, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

Some embodiments relate to HEW communications. In accordance with some IEEE 802.11ax embodiments, a master station 102 may operate as a master station which may be arranged to contend for a wireless medium (e.g., during a contention period) to receive exclusive control of the medium for an HEW control period. In some embodiments, the HEW control period may be termed a transmission opportunity (TXOP). The master station 102 may transmit a HEW master-sync transmission, which may be a trigger frame or HEW control and schedule transmission, at the beginning of the HEW control period. The master station 102 may transmit a time duration of the TXOP and sub-channel information. During the HEW control period, HEW STAs 104 may communicate with the master station 102 in accordance with a non-contention based multiple access technique such as OFDMA or MU-MIMO.

This is unlike conventional WLAN communications in which devices communicate in accordance with a contention-based communication technique, rather than a multiple access technique. During the HEW control period, the master station 102 may communicate with HEW stations 104 using one or more HEW frames. During the HEW control period, the HEW STAs 104 may operate on a sub-channel smaller than the operating range of the master station 102. During the HEW control period, legacy stations refrain from communicating.

In accordance with some embodiments, during the master-sync transmission the HEW STAs 104 may contend for the wireless medium with the legacy devices 106 being excluded from contending for the wireless medium during the master-sync transmission. In some embodiments the trigger frame may indicate an uplink (UL) UL-MU-MIMO and/or UL OFDMA control period.

In some embodiments, the multiple-access technique used during the HEW control period may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique.

The master station 102 may also communicate with legacy stations 106 and/or HEW stations 104 in accordance with legacy IEEE 802.11 communication techniques. In some embodiments, the master station 102 may also be configurable to communicate with HEW stations 104 outside the HEW control period in accordance with legacy IEEE 802.11 communication techniques, although this is not a requirement.

In example embodiments, the HEW device 104 and/or the master station 102 are configured to perform the methods and functions herein described in conjunction with FIGS. 1-13.

Figure 2:
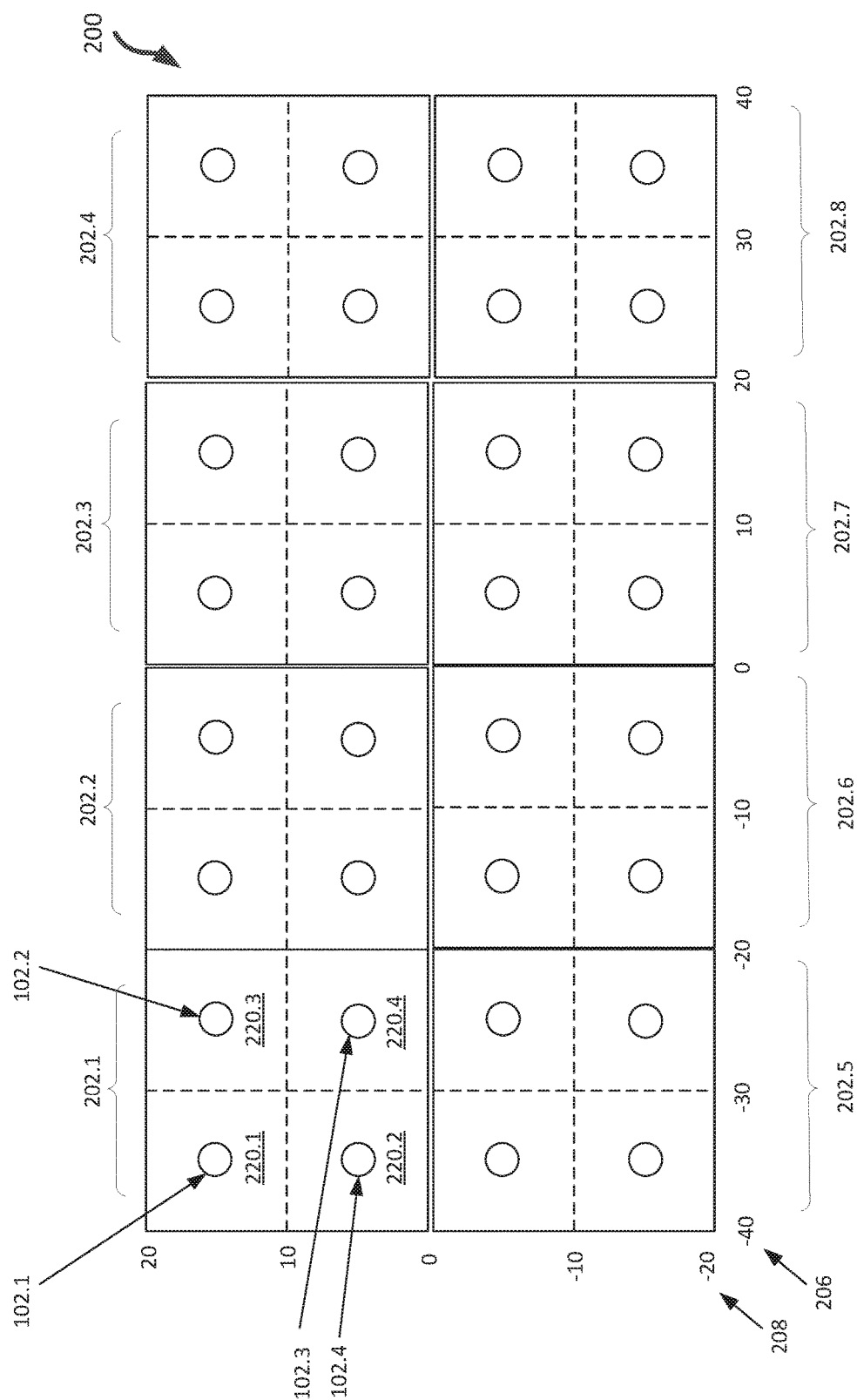
FIG. 2 illustrates a simulation in accordance with some embodiments.

FIG. 2 illustrates a simulation 200 in accordance with some embodiments. The simulation 200 is run in the enterprise scenario. FIG. 2 illustrates eight offices 202.1 through 202.8 in accordance with some embodiments. Illustrated along the horizontal axis 206 and vertical axis 208 are distance in meters. Each office 202 has four rooms 220 and four master stations 102 with one master station 102 per room 204. For example, office 202.1 includes four rooms 220.1 through 220.4 with each room 220 including a master station 102.1 through 102.4, respectively. In example embodiments, the eight offices may be a different size.

Figure 3:
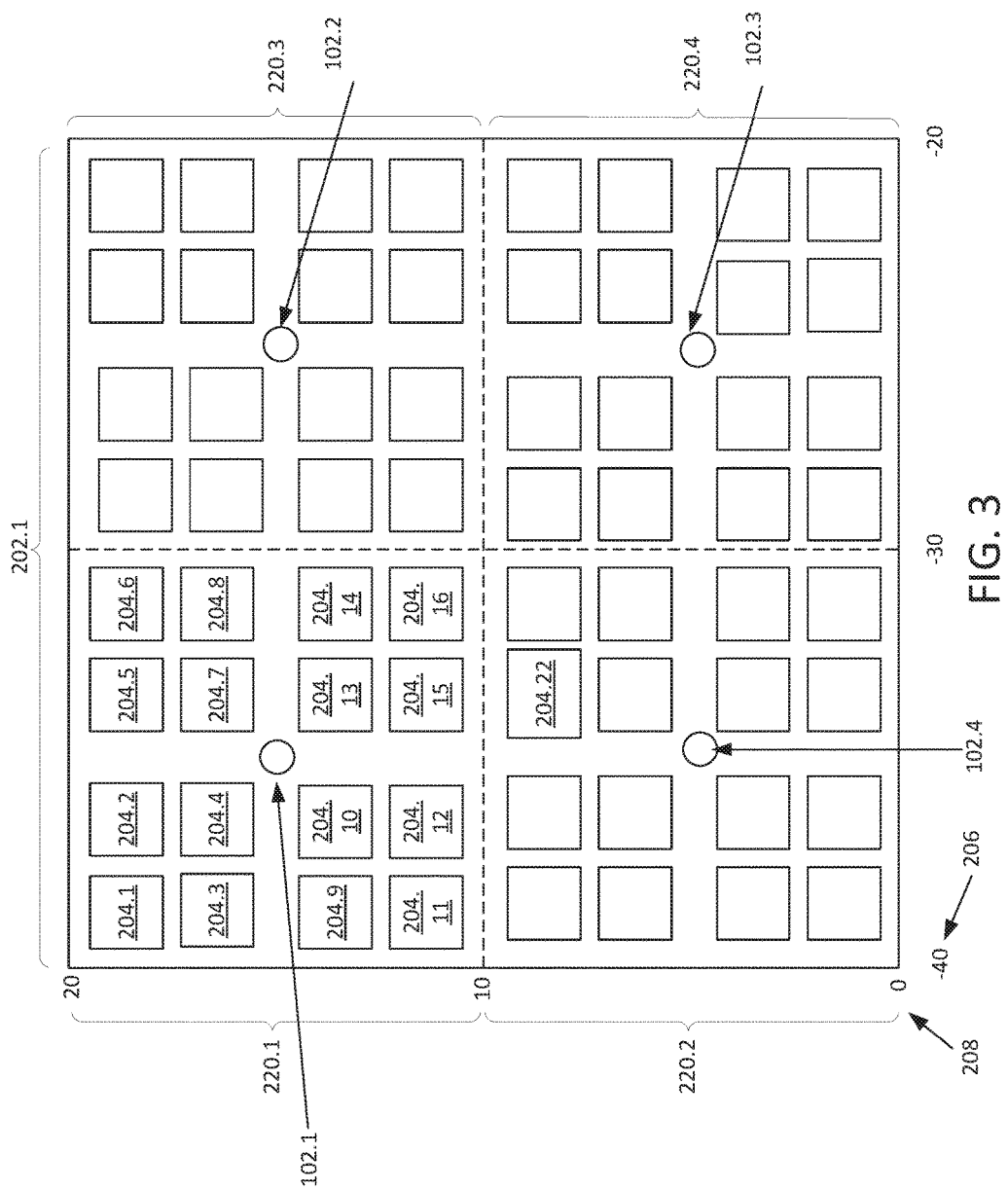
FIG. 3 illustrates an office of the eight offices of FIG. 2 in accordance with some embodiments.

FIG. 3 illustrates an office 202.1 of the eight offices 202 of FIG. 2 in accordance with some embodiments. Illustrated along the horizontal axis 206 and vertical axis 208 are distance in meters. Office 202.1 includes four rooms 220.1 through 220.4, and each room 220 includes sixteen cubicles 204.1 through 204.16 and one master station 102.1. Each cubicle 204 has a close link pair for reuse. Different close link pairs belong to different master stations 102. Half of the close link pairs are legacy devices and half of the close link pairs are IEEE 802.11ax devices.

In example embodiments, the eight offices may be a different size. In example embodiments, there may be a different number of rooms 220 and/or a different number of cubicles 204. In the simulation, each master station 102 uses a different 20 MHz channels in 5 GHz band. In the simulation, the maximum modulation and coding scheme (MCS) is 8 for 78 Mbps; the signal detect threshold is −82 dBm; the energy detect threshold is −62 dBm; the power used is 15 dBm; and, the duration of a transmission opportunity is 4 micro-seconds (ms).

The simulation is run in accordance with one or more embodiments with different levels of overlapping BSS preamble detect (OBSSPD) of −82 dBm to −62 dBm. OBSSPD of −82 dBm represents a baseline. The 50% of the devices in the simulation are legacy devices 106 and 50% of the devices are HEW stations 104 and/or master stations 102.

Figure 4:
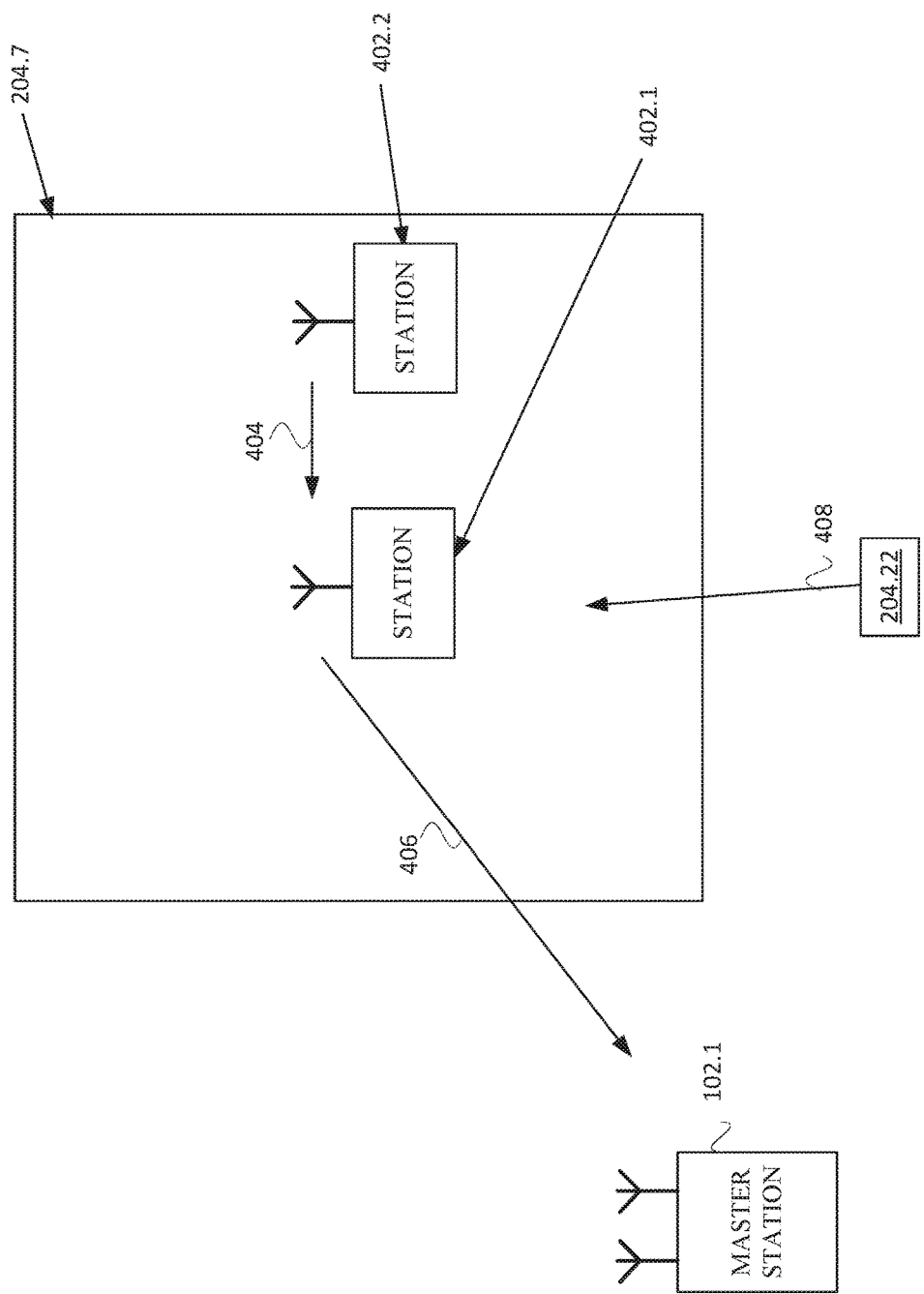
FIG. 4 illustrates a cubicle in accordance with some embodiments.

FIG. 4 illustrates a cubicle 204.7 in accordance with some embodiments. Each cubicle 204 may have two stations 402.1 and 404.2. The two stations may be 50% HEW stations 104 and 50% legacy devices 106. One station 402 may be may be transferring data to another station 404.2 using a D2D link 404. Link or transmission 406 illustrates a link that may occur between a station 402.1 and the master station 102.1. In example embodiments, transmission 408 may be from cubicle 204.22 which may be using the same subchannel as cubicle 204.7. So transmission 408 is an example of a transmission that may provide a spatial reuse opportunity. If the transmission 408 is between two legacy devices 106 then the transmission 408 is not considered for spatial reuse in accordance with the simulation of FIGS. 7 and 8 and is considered for spatial reuse in accordance with the simulation of FIGS. 5 and 6.

Figure 5:
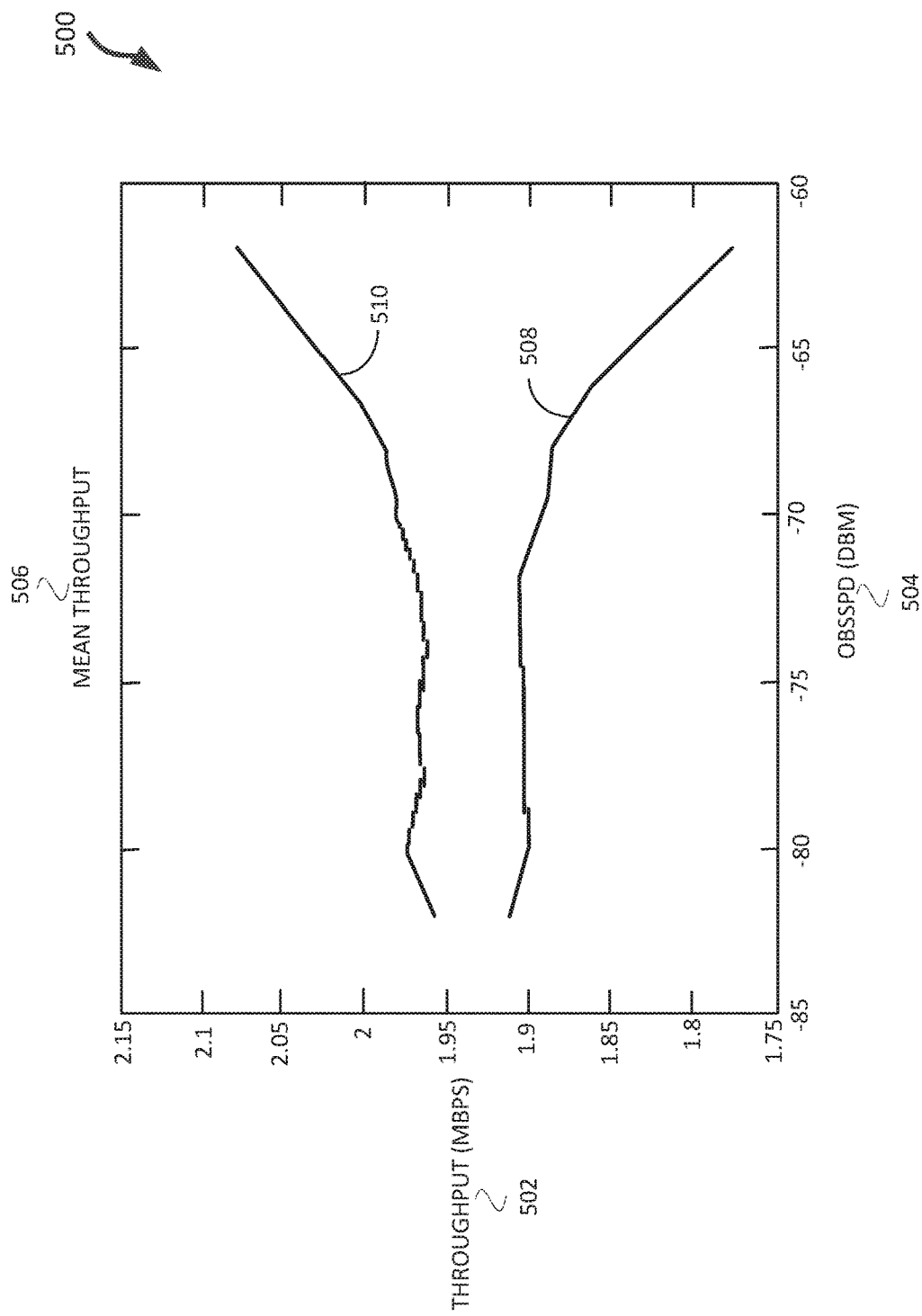
FIG. 5 illustrates a simulation with mean throughput in accordance with some embodiments.

FIG. 5 illustrates a simulation 500 with mean throughput 506 in accordance with some embodiments. FIG. 5 illustrates embodiments where transmissions between legacy devices 106 may be spatially reused by HEW stations 104 and/or master stations 102. Illustrated in FIG. 5 is throughput in mega bit per second (MBPS) 502 along a vertical axis and OBSSPD 504 in dBm along a horizontal axis 504. The performance of HEW stations 104 is illustrated as 510, and the performance of legacy wireless devices 106 is illustrated at 508. The simulation 500 illustrates that as the OBSSPD 504 is raised, that reuse is enabled between rooms 220 that use the same channel, but are part of a different office 202. For example, the lower right room 220 of office 202.5 (FIG. 2) and lower right room of 202.1 may begin spatial reuse using the same channel (each room 220 of an office 202 uses a different 20 MHz subchannel in the simulation 500). The simulation 500 illustrates that the performance 508 of legacy devices 106 suffer as the performance 510 of HEW devices 106 improve once the HEW devices 106 begin to use spatial reuse.

Figure 6:
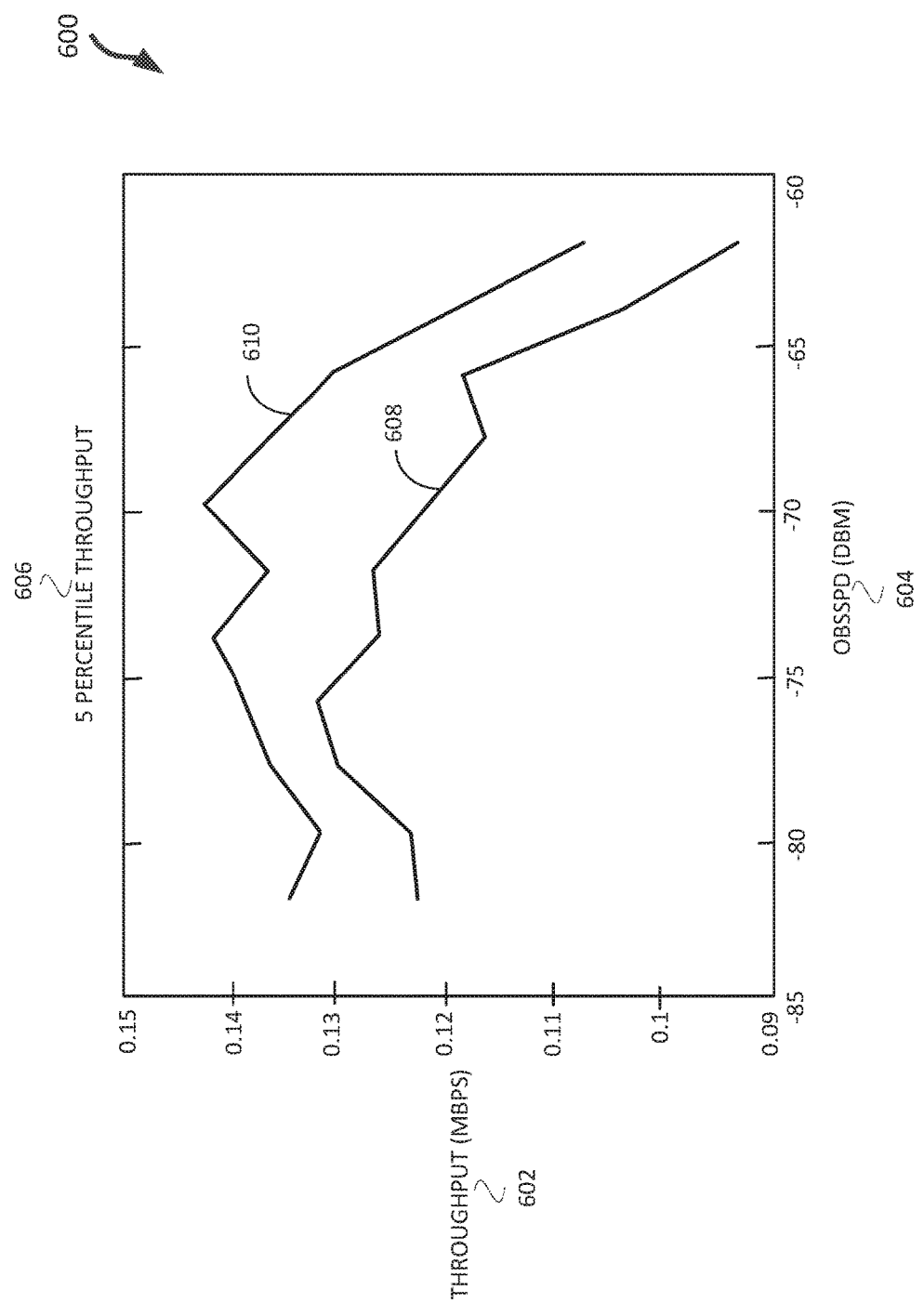
FIG. 6 illustrates the poorest 5 percentile for the simulation of FIG. 5 in accordance with some embodiments.

FIG. 6 illustrates the poorest 5 percentile 600 for the simulation of FIG. 5 in accordance with some embodiments. Illustrated in FIG. 6 is throughput in mega bit per second (MBPS) 602 along a vertical axis and OBSSPD 604 in dBm along a horizontal axis 604. The performance of HEW stations 104 is illustrated as 610, and the performance of legacy wireless devices 106 is illustrated at 608. The performance 510, 508 is of the devices with the poorest 5 percentile throughput 606 of the devices of the simulation described in conjunction with FIG. 5. FIG. 6 illustrates that the devices with the poorest 5 percentile throughput 606 do poorly as the spatial reuse begins to be used between offices 202 at about OBSSPD-72.

Figure 7:
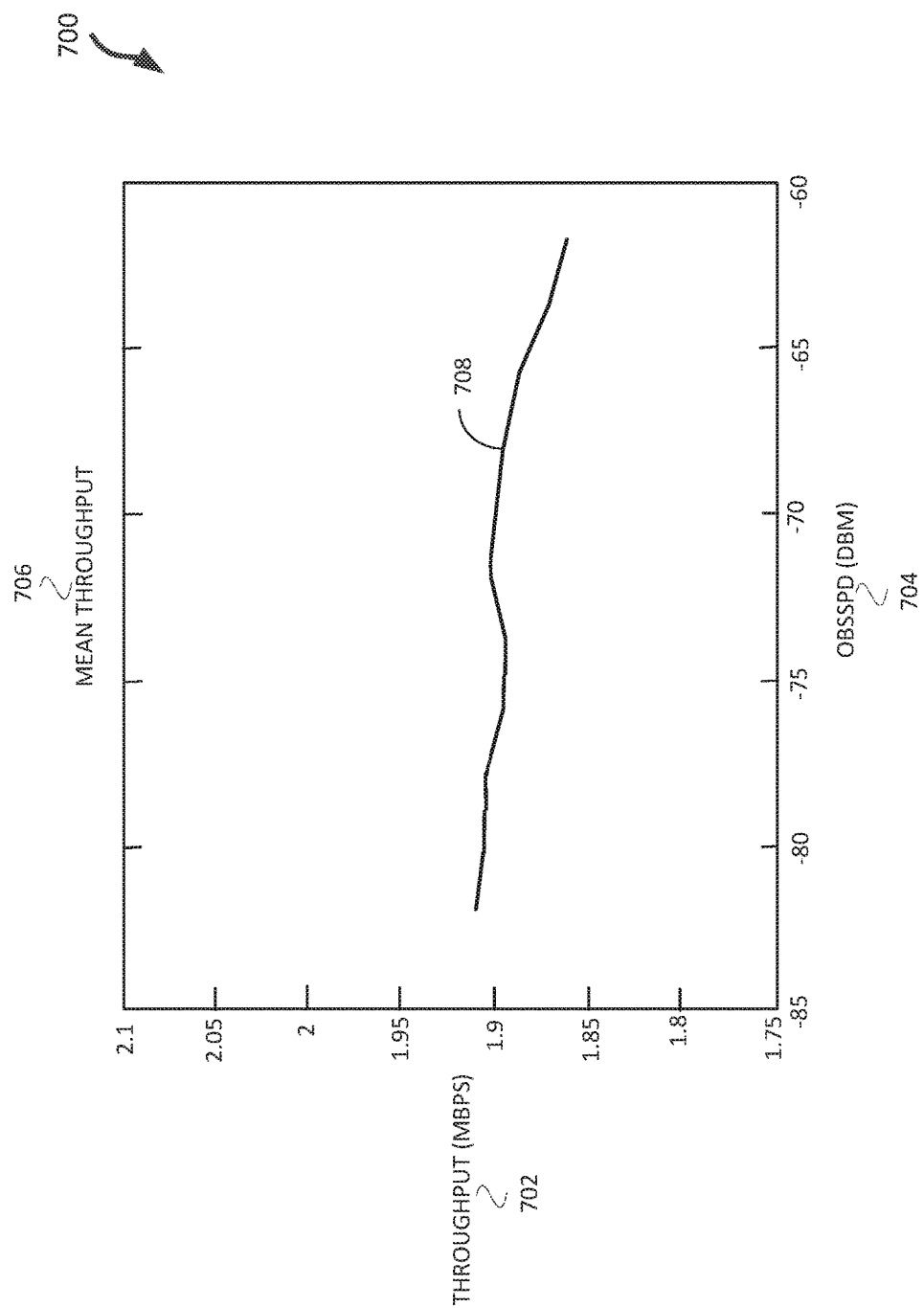
FIG. 7 illustrates a simulation with mean throughput in accordance with some embodiments.

FIG. 7 illustrates a simulation 700 with mean throughput 706 in accordance with some embodiments. FIG. 7 illustrates embodiments where transmissions between legacy devices 106 may not be spatially reused by HEW stations 104 and/or master stations 102. The transmissions of the legacy devices 106 and the HEW stations 104 are isolated from one another for spatial resuse. Illustrated in FIG. 7 is throughput in mega bit per second (MBPS) 702 along a vertical axis and OBSSPD 704 in dBm along a horizontal axis. The performance of legacy devices 106 is illustrated as 708. The performance of the legacy devices 106 does not suffer as much (compared with FIG. 5) when the legacy transmissions are not available to be spatially reused.

Figure 8:
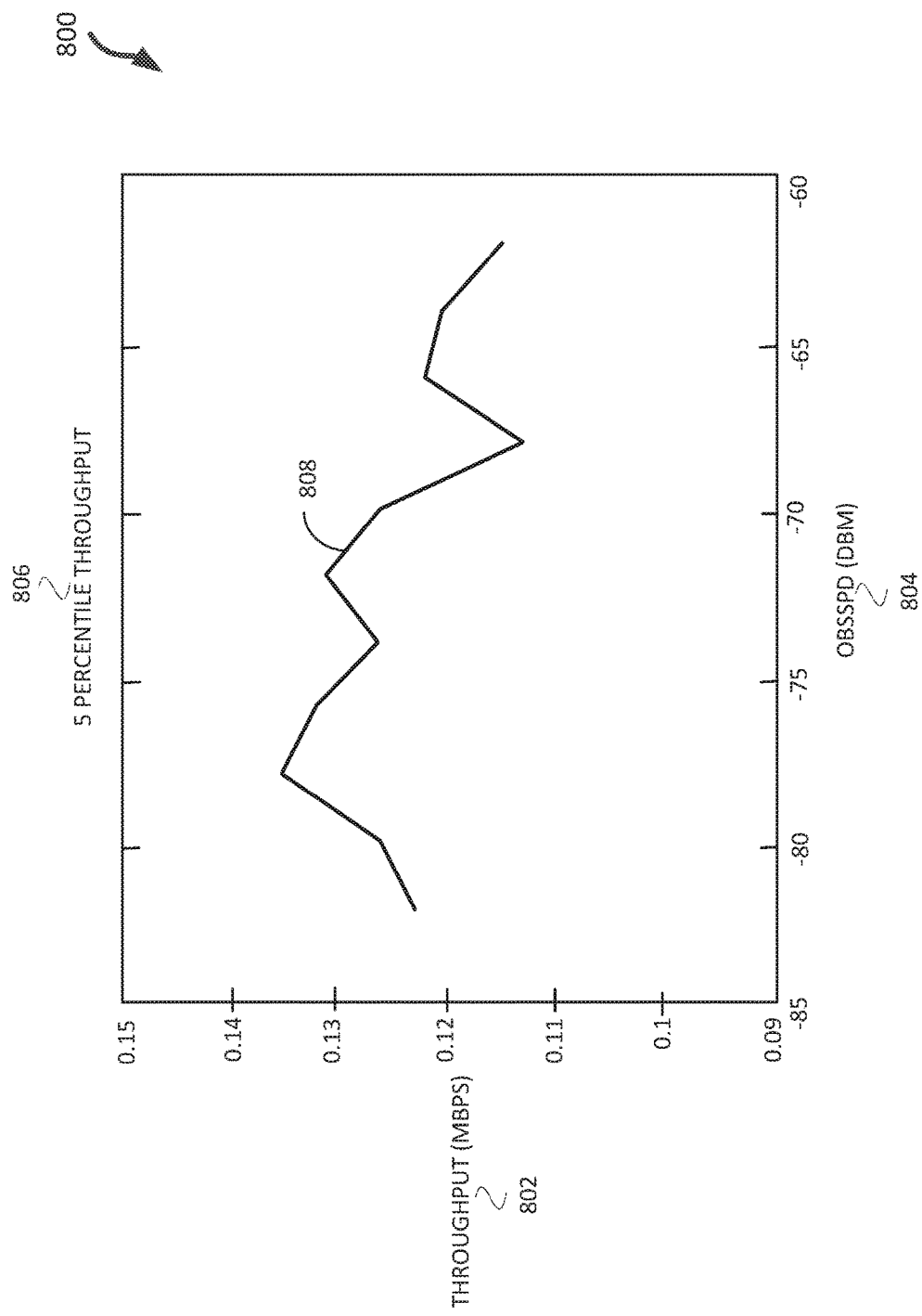
FIG. 8 illustrates the poorest 5 percentile for the simulation of FIG. 7 in accordance with some embodiments.

FIG. 8 illustrates the poorest 5 percentile 800 for the simulation of FIG. 7 in accordance with some embodiments. Illustrated in FIG. 8 is throughput in mega bit per second (MBPS) 802 along a vertical axis and OBSSPD 804 in dBm along a horizontal axis 804. The performance of legacy wireless devices 106 is illustrated at 808. The performance 808 is of the devices with the poorest 5 percentile throughput 806 of the devices of the simulation described in conjunction with FIG. 7. FIG. 8 illustrates that the devices with the poorest 5 percentile throughput 806 do not do as poorly when the HEW stations 104 and/or master station 102 do not use the transmissions of the legacy devices 106 for spatial reuse.

Figure 9:
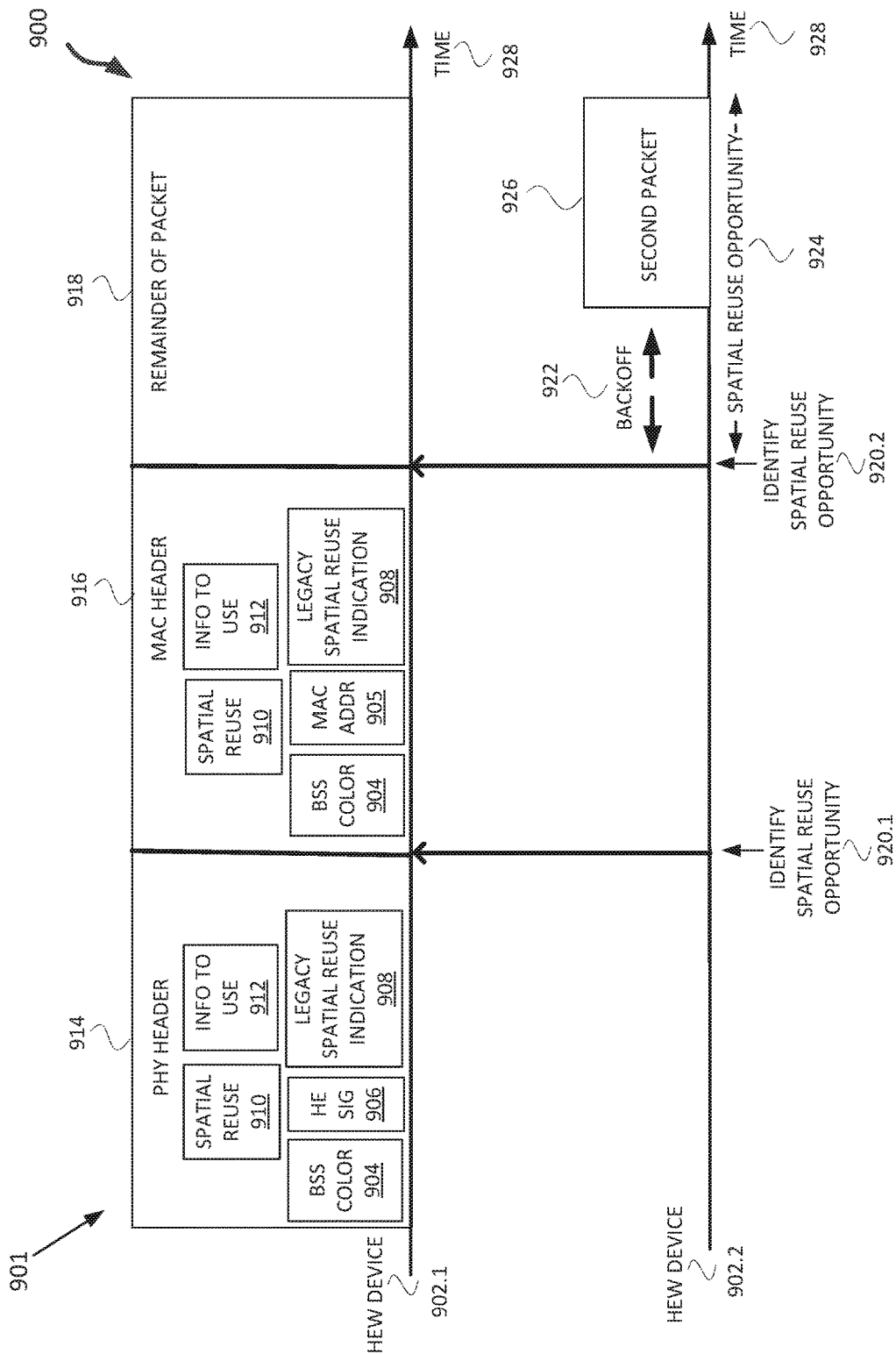
FIG. 9 illustrates a spatial reuse in accordance with some embodiments.

FIG. 9 illustrates a spatial reuse 900 in accordance with some embodiments. Illustrated in FIG. 9 are HEW devices 902, time 928 along a horizontal axis, a packet 901 comprising a PHY header 914, a MAC header 916, and remainder of packet 918, a back-off 922, a second packet 926, a spatial reuse opportunity 924, and an identify spatial reuse opportunity 920.1 and 902.2.

The HEW devices 202 may be a master station 102 or HEW station 104. The PHY header may include an high-energy signal (HE-SIG) 906 field, if the packet 901 is a HE packet 901. The HE-SIG 906 may be a HE-SIG 906 in accordance with IEEE 802.11ax. The packet 901 may be a packet 901 that is a legacy packet 901 with one or more fields in the PHY header 914 and/or MAC header 916 being used as HE fields.

The PHY header 914 and/or the MAC header 916 may include one or more of a BSS color 933, legacy spatial reuse indication 908 field, a spatial reuse 910 field, and information to use 912 field.

If the packet 901 is a legacy packet 901, then the legacy spatial reuse indication 908 field, a spatial reuse 910 field, and information to use 912 field may be a reserved bit or bits in accordance with IEEE 802.11 a/b/g in the PHY header 914 and/or a high-through (HT) control field in accordance with IEEE 802.11n, or a reserved bit or bits in a very HT (VHT) HT control field in accordance with IEEE 802.11ac in the MAC header 916.

If the packet 901 is a HE packet 901, then the spatial reuse 910 field and information to use 912 field may be fields in accordance with IEEE 802.11ax.

The legacy spatial reuse indication 908 may be used by a HEW device 904 to indicate that a transmission is or is not available for spatial reuse for a transmission that is from a HEW device 904. The transmission may be to a legacy device 106. For example, the transmission 1006 from HEW device 1002 to legacy device 106 illustrated in FIG. 10.

The spatial reuse 910 may be an indication of whether or not a transmission may be considered for spatial reuse. For example, spatial reuse may be a HE field or use of a legacy field that is used to indicate that a packet is not available (or is available) for spatial reuse in accordance with IEEE 802.11ax.

Information (info) to use 912 may be information that may indicate how to perform spatial reuse. For example, the info to use 912 may indicate an amount of interference, a transmit power to use, a transmit power used to transmit the packet 901, and/or a backoff window size. The info to use 912 may be recommendations or may be requirements in order to perform spatial reuse. Two or more of the legacy spatial reuse indication 908, the info to use 912 and the spatial reuse 910 may be merged into a single field.

The second packet 926 may be a packet that a HEW device 904 may transmit. The BSS color 932 may be an identification that identifies the BSS 100 that the HEW device 902.1 is associated with. The MAC address 930 may be an address of the transmitter of the packet 901 or an intended receiver of the packet 901. The HEW device 902 may use the MAC address 930 to determine whether or not the packet is an overlapping BSS packet or a BSS packet. For example, the HEW device 902 may store an address of a master station 102 the HEW device 902 is associated with and then determine whether or not the MAC address 930 is the same as the address of the master station 102 the HEW device 902 is associated with. The master station 102 may set a locally administered bit in the MAC address to one to indicate that the master station 102 generated the MAC address. A spatial reuse opportunity 924 may only exist if the PHY header 914 and/or the MAC header 916 indicate a spatial reuse opportunity 924 exists, and if it can be determined that the packet 901 is an OBSS packet and not a BSS packet.

The HEW device 902.1 transmits packet 901 with a PHY header 914, MAC header 916, and remainder of packet 918. The HEW device 902.1 at time 920.1 or 920.2 identifies a spatial reuse opportunity 924 based on the PHY header 914 and/or MAC header 916. The HEW device 902.2 may identify that the spatial reuse opportunity 924 exists if the following three conditions are met: (1) an indication in the PHY header 914 or MAC header 916 that spatial reuse is permissible; (2) an OBSSPD level determined for the PHY header 914 and/or MAC header 916 is above a threshold; and, (3) an indication in the PHY header 914 and/or MAC header 916 that the packet 901 is an OBSS packet. The HEW device 902.2 may identify the spatial reuse opportunity 920.1, 920.2 (e.g., that the spatial reuse opportunity 924 exists or does not exist) after the PHY header 914, or the after the MAC header 916, respectively.

The following examples indicate that the packet 901 is available or is not available for spatial reuse. For example, the HEW device 902.1 may determine that the PHY header 914 includes a HE-SIG 906 that indicates the packet 901 is a HE packet 901 in accordance with IEEE 802.11ax. In another example, the HEW device 904 may determine that the PHY header 914 and/or MAC header 916 includes a legacy spatial reuse indication 908 that indicates that the packet 901 is transmitted from a HEW device 902.1 and is available for spatial reuse (or not available.) The spatial reuse 910 may indicate that the packet 901 is available (or not available) for spatial reuse when the packet 901 is a HE packet 901. The information to use 912 may indicate whether or not the packet 901 is available (or not available) for spatial reuse and may indicate how the spatial reuse may or must be used.

If the HEW device 902.1 determines at 920 that spatial reuse may be available based on the PHY header 914 and/or MAC header 916, OBSSPD level of the PHY header 914 and, in some embodiments, the MAC header 916, and determine that the packet is an OBSS packet, then the HEW device 904 may attempt to use the spatial reuse opportunity 924 by performing a clear-channel assessment (CCA) with a backoff 922 window. The HEW device 904 may backoff for a time before performing the CCA. The HEW device 904 may modify one or more parameters of the window and/or CCA parameters based on the information to use 912. The HEW device 904 may then transmit second packet 926 within the spatial reuse opportunity 924. The HEW device 904 may determine how long the spatial reuse opportunity 924 is based on a duration indicated in the packet 901.

Figure 10:
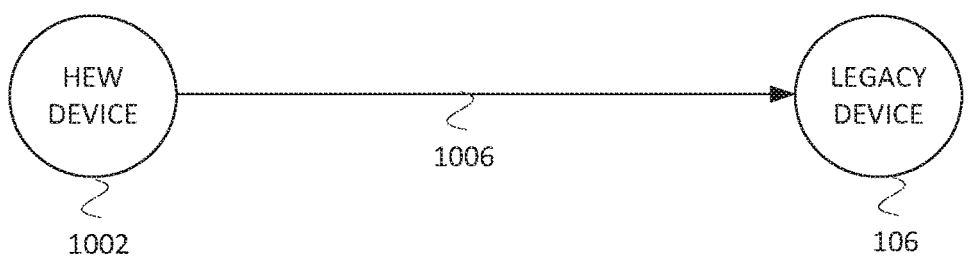
FIG. 10 illustrates a high-efficiency wireless local-area network (HEW) device transmitting to a legacy device in accordance with some embodiments.

FIG. 10 illustrates a high-efficiency wireless local-area network (HEW) device 1002 transmitting to a legacy device in accordance with some embodiments. HEW device 1002 may transmit a packet or packets in a transmission 1006 to a legacy device 106. The HEW device 1002 may indicate in a legacy spatial reuse indication 908 (FIG. 9) that the transmission 1006 is available (or not) for spatial reuse. The HEW device 1002 may be a HEW station 104 or master station 102.

Figure 11:
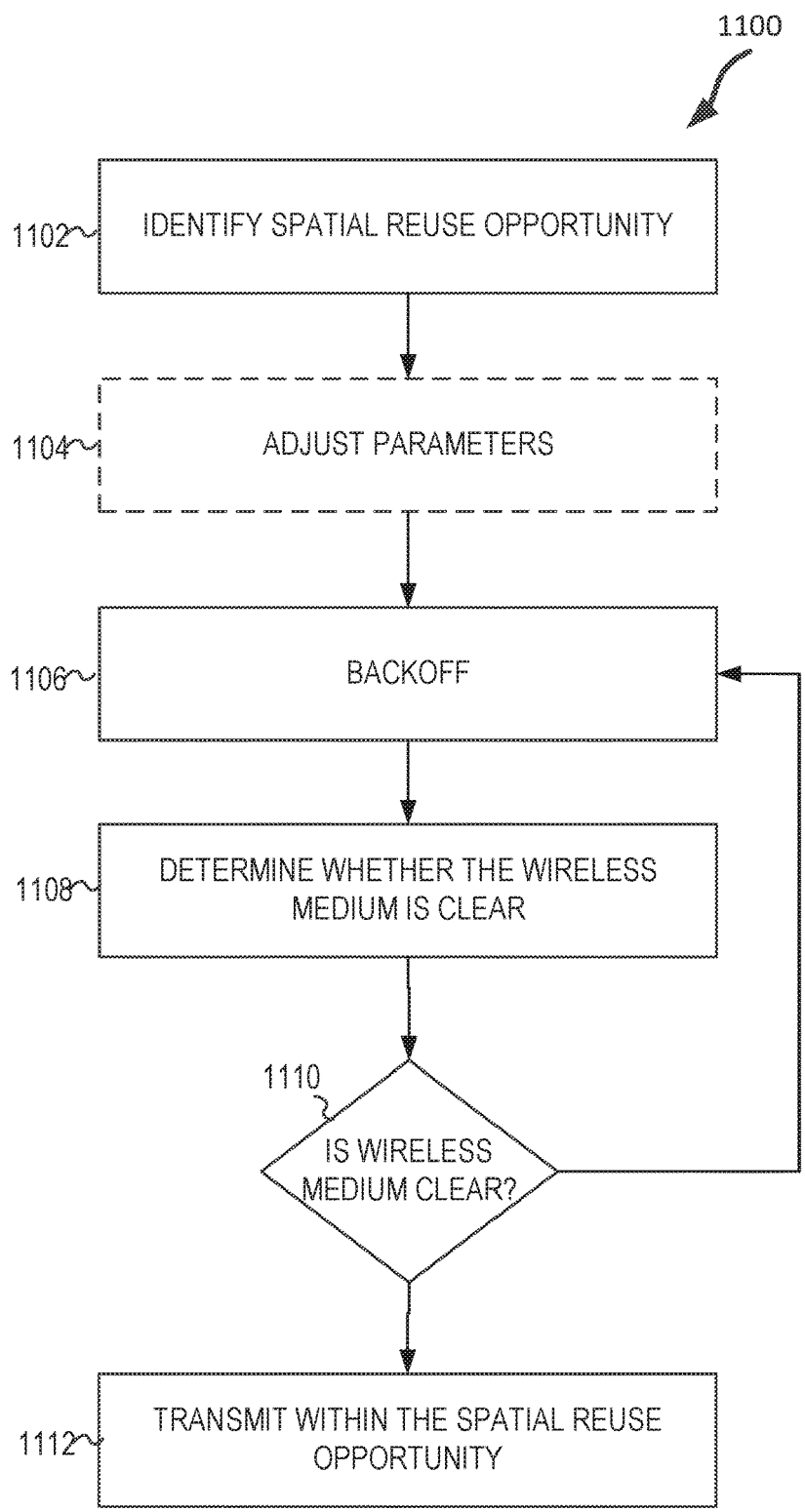
FIG. 11 illustrates a method for co-existence for spatial reuse in wireless local area networks in accordance with some embodiments.

FIG. 11 illustrates a method 1100 for co-existence for spatial reuse in wireless local area networks in accordance with some embodiments. The method 1100 may begin at operation 1102 with identifying spatial reuse opportunity. For example, the HEW device 902.2 may identify that the spatial reuse opportunity 924 exists if the following three conditions are met: (1) an indication in the PHY header 914 or MAC header 916 that spatial reuse is permissible; (2) an OBSSPD level determined for the PHY header 914 and/or MAC header 916 is above a threshold; and, (3) an indication in the PHY header 914 and/or MAC header 916 that the packet 901 is an OBSS packet.

The method 1100 may optionally continue at operation 1104 with adjusting parameters. For example, HEW device 904 may decode information to use 912 and adjust one or more parameters based on the information to use 912. For example, the transmit power or backoff window. The method 1100 may continue at operation 1106 with backing off. For example, HEW device 904 may perform the backoff 922 as disclosed in conjunction with FIG. 9. The method 1100 may continue at operation 1108 with determining whether the wireless medium is clear. For example, as described in conjunction with FIG. 9, HEW device 904 may determine if the wireless medium is clear. The method 1100 may continue at operation 1112 with transmitting within the spatial reuse opportunity. For example, HEW device 902.2 may transmit the second packet 926 as described in conjunction with FIG. 9. The method 1100 may end.

Figure 12:
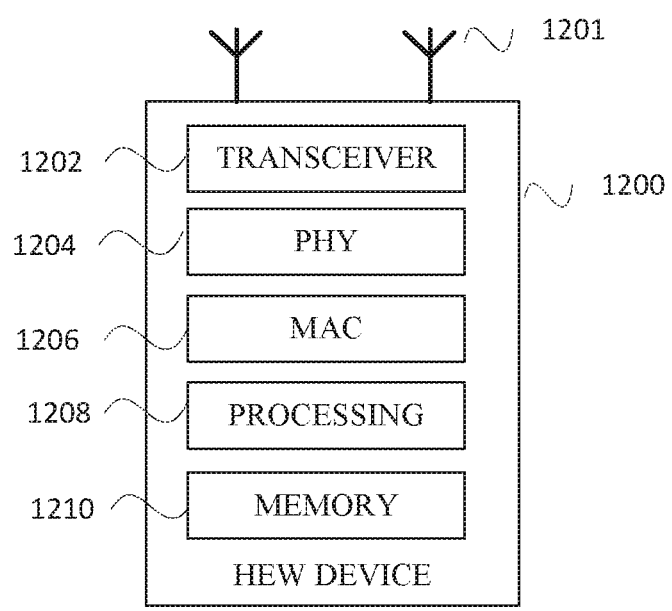
FIG. 12 illustrates a HEW device in accordance with some embodiments.

FIG. 12 illustrates a HEW device in accordance with some embodiments. HEW device 1200 may be an HEW compliant device that may be arranged to communicate with one or more other HEW devices, such as HEW STAs 104 (FIG. 1) or master station 102 (FIG. 1) as well as communicate with legacy devices 106 (FIG. 1). HEW STAs 104 and legacy devices 106 may also be referred to as HEW devices and legacy STAs, respectively. HEW device 1200 may be suitable for operating as master station 102 (FIG. 1) or a HEW STA 104 (FIG. 1). In accordance with embodiments, HEW device 1200 may include, among other things, a transmit/receive element 1201 (for example an antenna), a transceiver 1202, physical (PHY) circuitry 1204, and media access control (MAC) circuitry 1206. PHY circuitry 1204 and MAC circuitry 1206 may be HEW compliant layers and may also be compliant with one or more legacy IEEE 802.11 standards. MAC circuitry 1206 may be arranged to configure packets such as a physical layer convergence procedure (PLCP) protocol data unit (PPDUs) and arranged to transmit and receive PPDUs, among other things. HEW device 1200 may also include circuitry 1208 and memory 1210 configured to perform the various operations described herein. The circuitry 1208 may be coupled to the transceiver 1202, which may be coupled to the transmit/receive element 1201. While FIG. 12 depicts the circuitry 1208 and the transceiver 1202 as separate components, the circuitry 1208 and the transceiver 1202 may be integrated together in an electronic package or chip.

In some embodiments, the MAC circuitry 1206 may be arranged to contend for a wireless medium during a contention period to receive control of the medium for the HEW control period and configure an HEW PPDU. In some embodiments, the MAC circuitry 1206 may be arranged to contend for the wireless medium based on channel contention settings, a transmitting power level, and a CCA level.

The PHY circuitry 1204 may be arranged to transmit the HEW PPDU. The PHY circuitry 1204 may include circuitry for modulation/demodulation, upconversion/downconversion, filtering, amplification, etc. In some embodiments, the circuitry 1208 may include one or more processors. The circuitry 1208 may be configured to perform functions based on instructions being stored in a RAM or ROM, or based on special purpose circuitry. The circuitry 1208 may be termed processing circuitry in accordance with some embodiments. The circuitry 1208 may include a processor such as a general purpose processor or special purpose processor. The circuitry 1208 may implement one or more functions associated with transmit/receive elements 1201, the transceiver 1202, the PHY circuitry 1204, the MAC circuitry 1206, and/or the memory 1210.

In some embodiments, the circuitry 1208 may be configured to perform one or more of the functions and/or methods described herein and/or in conjunction with FIGS. 1-12 such as identifying spatial reuse opportunities, signaling spatial reuse opportunities, and spatially reusing one or more channels.

In some embodiments, the transmit/receive elements 1201 may be two or more antennas that may be coupled to the PHY circuitry 1204 and arranged for sending and receiving signals including transmission of the HEW packets. The transceiver 1202 may transmit and receive data such as HEW PPDU and packets that include an indication that the HEW device 1200 should adapt the channel contention settings according to settings included in the packet. The memory 1210 may store information for configuring the other circuitry to perform operations for configuring and transmitting HEW packets and performing the various operations to perform one or more of the functions and/or methods described herein and/or in conjunction with FIGS. 1-12 such as identifying spatial reuse opportunities, signaling spatial reuse opportunities, and spatially reusing one or more channels.

In some embodiments, the HEW device 1200 may be configured to communicate using OFDM communication signals over a multicarrier communication channel. In some embodiments, HEW device 1200 may be configured to communicate in accordance with one or more specific communication standards, such as the Institute of Electrical and Electronics Engineers (IEEE) standards including IEEE 802.11-2012, 802.11n-2009, 802.11ac-2013, 802.11ax, DensiFi, standards and/or proposed specifications for WLANs, or other standards as described in conjunction with FIG. 1, although the scope of the invention is not limited in this respect as they may also be suitable to transmit and/or receive communications in accordance with other techniques and standards. In some embodiments, the HEW device 1200 may use 4× symbol duration of 802.11n or 802.11ac.

In some embodiments, an HEW device 1200 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), an access point, a base station, a transmit/receive device for a wireless standard such as 802.11 or 802.16, or other device that may receive and/or transmit information wirelessly. In some embodiments, the mobile device may include one or more of a keyboard, a display, a non-volatile memory port, multiple antennas, a graphics processor, an application processor, speakers, and other mobile device elements. The display may be an LCD screen including a touch screen.

The transmit/receive element 1201 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result.

Figure 13:
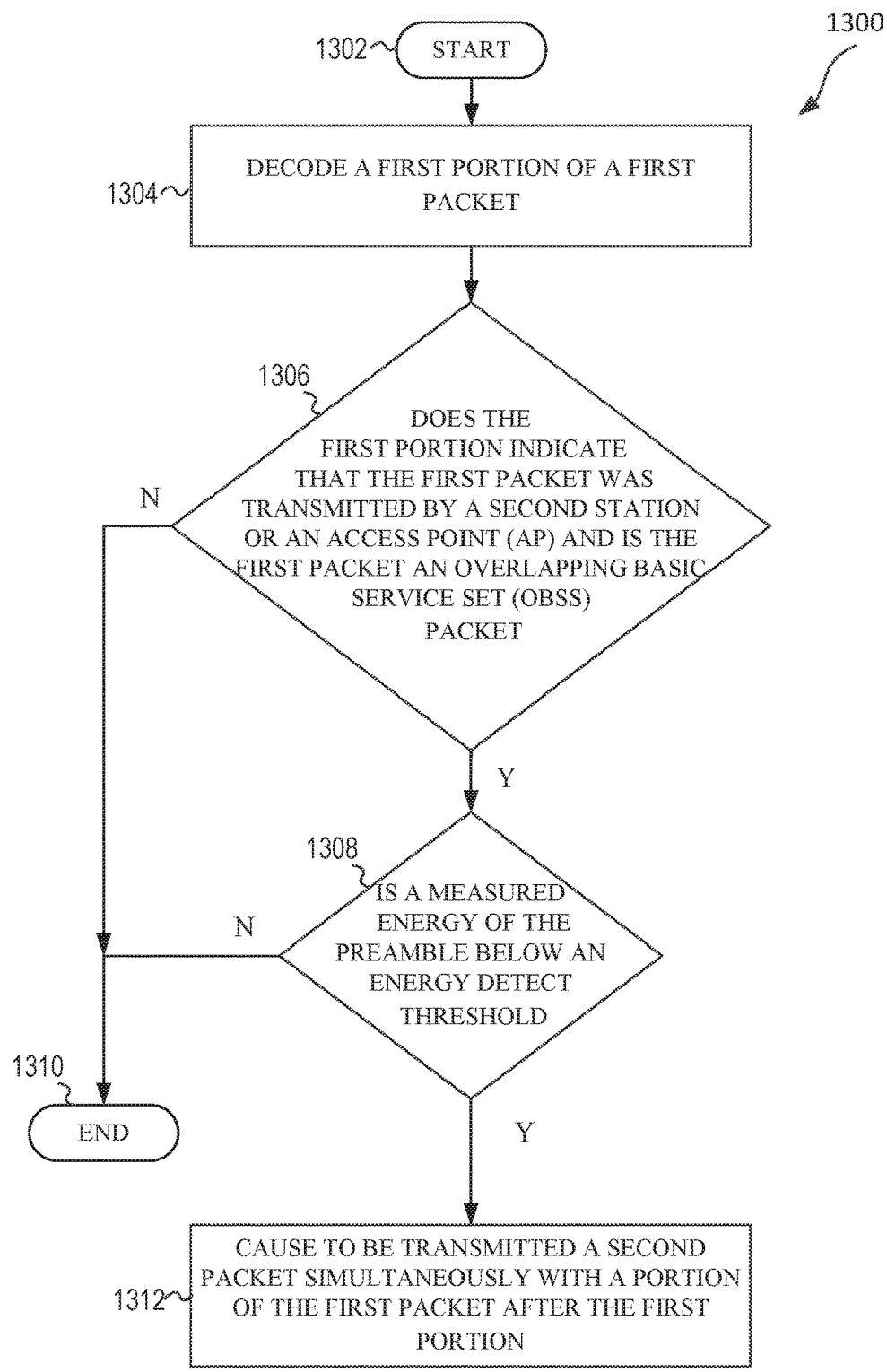
FIG. 13 illustrates a method for co-existence for spatial reuse in wireless local area networks in accordance with some embodiments.

FIG. 13 illustrates a method 1300 for co-existence for spatial reuse in wireless local area networks in accordance with some embodiments. The method 1300 begins at operation 1302 with start 1302. The method 1300 continues at operation 1304 with decoding a first portion of a first packet. The method 1300 continues at operation 1306 with does the first portion indicate the first packet was transmitted by a second station or an access point (AP) and is the first packet an OBSS packet. If the first portion does not indicate the first packet was transmitted by a second station or an AP, then the method 1300 continues to end 1310. If the first packet is not an OBSS packet, then the method 1300 continues to end 1310. The operation end 1310 may indicate the end of the method. If the first portion does indicate the first packet was transmitted by a second station or an AP, and the first packet is an OBSS packet, then the method 1300 continues at operation 1308 with is a measured energy of the preamble below an energy detect threshold. If the measured energy is not below an energy detect threshold, then the method 1300 may continue at operation 1310. If the measured energy is below an energy detect threshold, then the method 1300 may continue to operation 1312 with causing to be transmitted a second packet simultaneously with a portion of the first packet after the first portion. The operations of the method are supported throughout the specification.

Although the HEW device 1200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. Those instructions may then be read and executed by one or more processors to cause the device 1800 to perform the methods and/or operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The following examples pertain to further embodiments. Example 1 is an apparatus of a first station. The apparatus comprising memory and processing circuitry coupled to the memory, the processing circuitry configured to: decode a first portion of a first packet, and if the first portion indicates the first packet was transmitted by a second station or an access point (AP) and that the first packet is an overlapping basic service set (OBSS) packet, then if a preamble detect energy is below a threshold, cause to be transmitted a second packet simultaneously with a portion of the first packet after the first portion.

In Example 2, the subject matter of Example 1 can optionally include where the processing circuitry is further configured to: if the first portion indicates not to use a spatial reuse opportunity, then do not cause to be transmitted the second packet simultaneously with the portion of the first packet after the first portion.

In Example 3, the subject matter of Example 2 can optionally include where the first portion indicates not to use the spatial reuse opportunity in a field of a physical (PHY) header or in a field of a media access control (MAC) header.

In Example 4, the subject matter of any of Examples 1-3 can optionally include where the processing circuitry is configured to: determine the first portion was transmitted by the second station or the AP if the first portion is a physical (PHY) header comprising a HE signal (HE-SIG) field.

In Example 5, the subject matter of any of Examples 1-4 can optionally include where the processing circuitry is configured to: determine the first portion was transmitted by the second station or the AP if a field in a physical (PHY)

header or a second field in a media access control (MAC) header indicate the first packet was transmitted by the second station or AP.

In Example 6, the subject matter of Example 5 can optionally include where the field in the PHY header is one or more reserved bits in a service field, wherein the PHY header is a legacy PHY header, and wherein the field in the MAC header is one or more reserved bits in a high-throughput (HT) control field or one or more reserved bits in a very-high throughput (VHT) HT control field.

In Example 7, the subject matter of any of Examples 1-6 can optionally include where the processing circuitry is configured to: determine the first packet is an OBSS packet if a color of a basic service set (BSS) of the first station is not the same as a color indicated in first portion, wherein the color indicated in the first portion is a field in a HE physical (PHY) header or a field in a HE media access control (MAC) header.

In Example 8, the subject matter of Example 7 can optionally include where the processing circuitry is further configured to: determine if the MAC header indicates the first packet is the OBSS packet if a MAC address subfield of the MAC header that indicates a basic service set identification (BSSID) is not the same as a BSSID of an access point the wireless device is associated with.

In Example 9, the subject matter of any of Examples 1-8 can optionally include where the processing circuitry is further configured to: wait a backoff window duration, and determine a clear channel assessment (CCA) after the backoff, then if the CCA indicates a clear channel, cause to be transmitted the second packet simultaneously with a portion of the first packet after the first portion of the first packet.

In Example 10, the subject matter of any of Examples 1-9 can optionally include where the processing circuitry is further configured to determine a transmit power based on a subfield in a physical (PHY) header of the first portion or a subfield in a media access control (MAC) header and a received energy of at least the PHY header, wherein the subfield indicates at least one from the following group: a transmission power used to transmit the first packet, a tolerable interference, or a sum of both; and cause to be transmitted with the determined transmit power the second packet simultaneously after the first portion of the first packet.

In Example 11, the subject matter of any of Examples 1-10 can optionally include where the first station, the second station, and the AP are each one from the following group: a HE master station, a HE station, Institute of Electrical and Electronic Engineering (IEEE) 802.11ax station, and an IEEE 802.11ax access point.

In Example 12, the subject matter of any of Examples 1-11 can optionally include where the processing circuitry is configured to transmit and receive in accordance with orthogonal frequency division multiple access (OFDMA) and multi-user orthogonal frequency division multiple access (MU-MIMO) within a transmission opportunity (TXOP).

In Example 13, the subject matter of any of Examples 1-12 can optionally include transceiver circuitry coupled to the processing circuitry.

In Example 14, the subject matter of any of Examples 1-13 can optionally include one or more antennas coupled to the processing circuitry.

Example 15 is a non-transitory computer-readable storage medium that stores instructions for execution by one or more processors to perform operations to configure a first station to: decode a first portion of a first packet; and if the first portion indicates the first packet was transmitted by a second station or an access point (AP) and that the first packet is an overlapping basic service set (OBSS) packet, then if a preamble detect energy is below a threshold, cause to be transmitted a second packet simultaneously with a portion of the first packet after the first portion.

In Example 16, the subject matter of Example 15 can optionally include where the operations further configure the wireless device to: determine the first portion was transmitted by the second station or the AP if the first portion is a physical (PHY) header comprising a HE signal (HE-SIG) field.

In Example 17, the subject matter of Examples 15 or 16 can optionally include where the operations further configure the wireless device to: determine the first portion was transmitted by the second station or the AP if a field in a physical (PHY) header or a second field in a media access control (MAC) header indicate the first packet was transmitted by the second HE AP or station.

In Example 18, the subject matter of any of Examples 15-17 can optionally include where the field in the PHY header is one or more reserved bits in a service field, wherein the PHY header is a legacy PHY header, and wherein the field in the MAC header is one or more reserved bits in a high-throughput (HT) control field or one or more reserved bits in a very-high throughput (VHT) HT control field, and wherein the MAC header is a legacy MAC header.

Example 19 is a method performed by a first station, the method comprising: decoding a first portion of a first packet; and if the first portion indicates the first packet was transmitted by a second station or an access point (AP) and that the first packet is an overlapping basic service set (OBSS) packet, then if a preamble detect energy is below a threshold, causing to be transmitted a second packet simultaneously with a portion of the first packet after the first portion.

In Example 20, the subject matter of Example 19 can optionally include determining the first portion was transmitted by the second station or the AP if a field in a physical (PHY) header or a second field in a media access control (MAC) header indicate the first packet was transmitted by the second station or the AP.

Example 21 is an apparatus of a first access point (AP), the apparatus comprising memory and processing circuitry coupled to the memory, the processing circuitry configured to: encode a first portion of a first packet to indicate a spatial reuse opportunity with a transmission of a first packet; encode the first portion to indicate a basic service set (BSS) packet of the wireless device; and cause to be transmitted the first packet.

In Example 22, the subject matter of Example 21 can optionally include where the first portion comprises a legacy physical (PHY) header, and wherein the processing circuitry is further configured to: encode a service field of the legacy PHY header to indicate the spatial reuse opportunity.

In Example 23, the subject matter of Examples 21 or 22 can optionally include where the first portion comprises a legacy media access control (MAC) header, and wherein the processing circuitry is configured to: encode a reserved bit or bits in a high-throughput (HT) control field or a reserved bit or bits in a very high-throughput (VHT) control field of the legacy MAC header to indicate the spatial reuse opportunity.

In Example 24, the subject matter of any of Examples 21-23 can optionally include where the first portion is to comprise a subfield that indicates that the first packet is available or not available for the spatial reuse opportunity.

In Example 25, the subject matter of any of Examples 21-24 can optionally include one or more antennas coupled to the processing circuitry.

Example 26 is an apparatus of a first station, the apparatus comprising: means for decoding a first portion of a first packet; and if the first portion indicates the first packet was transmitted by a second station or an access point (AP) and that the first packet is an overlapping basic service set (OBSS) packet, then if a preamble detect energy is below a threshold, means for causing to be transmitted a second packet simultaneously with a portion of the first packet after the first portion.

In Example 27, the subject matter of Example 26 can optionally include means for determining if the first portion indicates not to use a spatial reuse opportunity, then means for not causing to be transmitted the second packet simultaneously with the portion of the first packet after the first portion.

In Example 28, the subject matter of Example 27 can optionally include where the first portion indicates not to use the spatial reuse opportunity in a field of a physical (PHY) header or in a field of a media access control (MAC) header.

In Example 29, the subject matter of any of Examples 26-28 can optionally include means for determining the first portion was transmitted by the second station or the AP if the first portion is a physical (PHY) header comprising a HE signal (HE-SIG) field.

In Example 30, the subject matter of any of Examples 26-29 can optionally include means for determining the first portion was transmitted by the second station or the AP if a field in a physical (PHY) header or a second field in a media access control (MAC) header indicate the first packet was transmitted by the second station or AP.

In Example 31, the subject matter of Example 30 can optionally include where the field in the PHY header is one or more reserved bits in a service field, wherein the PHY header is a legacy PHY header, and wherein the field in the MAC header is one or more reserved bits in a high-throughput (HT) control field or one or more reserved bits in a very-high throughput (VHT) HT control field.

In Example 32, the subject matter of any of Examples 26-31 can optionally include means for determining the first packet is an OBSS packet if a color of a basic service set (BSS) of the first station is not the same as a color indicated in first portion, wherein the color indicated in the first portion is a field in a HE physical (PHY) header or a field in a HE media access control (MAC) header.

In Example 33, the subject matter of Examples 32 can optionally include means for determining if the MAC header indicates the first packet is the OBSS packet if a MAC address subfield of the MAC header that indicates a basic service set identification (BSSID) is not the same as a BSSID of an access point the wireless device is associated with.

In Example 34, the subject matter of any of Examples 26-33 can optionally include means for waiting a backoff window duration, and determine a clear channel assessment (CCA) after the backoff, then if the CCA indicates a clear channel, cause to be transmitted the second packet simultaneously with a portion of the first packet after the first portion of the first packet.

In Example 35, the subject matter of any of Examples 26-34 can optionally include means for determining a transmit power based on a subfield in a physical (PHY) header of the first portion or a subfield in a media access control (MAC) header and a received energy of at least the PHY header, wherein the subfield indicates at least one from the following group: a transmission power used to transmit the first packet, a tolerable interference, or a sum of both; and means for causing to be transmitted with the determined transmit power the second packet simultaneously after the first portion of the first packet.

In Example 36, the subject matter of any of Examples 26-35 can optionally include where the first station, the second station, and the AP are each one from the following group: a HE master station, a HE station, Institute of Electrical and Electronic Engineering (IEEE) 802.11ax station, and an IEEE 802.11ax access point.

In Example 37, the subject matter of any of Examples 26-36 can optionally include means for transmitting and receiving radio frequency signals in accordance with orthogonal frequency division multiple access (OFDMA) and multi-user orthogonal frequency division multiple access (MU-MIMO) within a transmission opportunity (TXOP).

In Example 38, the subject matter of any of Examples 26-37 can optionally include means for transmitting and receiving radio frequency signals.

Example 39 is a method performed by an a first access point (AP), the method comprising: encoding a first portion of a first packet to indicate a spatial reuse opportunity with a transmission of a first packet; encoding the first portion to indicate a basic service set (BSS) packet of the wireless device; and causing to be transmitted the first packet.

In Example 40, the subject matter of Example 39 can optionally include where the first portion comprises a legacy physical (PHY) header, and wherein the method further comprises: encoding a service field of the legacy PHY header to indicate the spatial reuse opportunity.

In Example 41, the subject matter of Examples 39 or 40 can optionally include where the first portion comprises a legacy media access control (MAC) header, and wherein the method further comprises: encoding a reserved bit or bits in a high-throughput (HT) control field or a reserved bit or bits in a very high-throughput (VHT) control field of the legacy MAC header to indicate the spatial reuse opportunity.

In Example 42, the subject matter of any of Examples 39-41 can optionally include where the first portion is to comprise a subfield that indicates that the first packet is available or not available for the spatial reuse opportunity.

Example 43 is a non-transitory computer-readable storage medium that stores instructions for execution by one or more processors to perform operations to configure an access point to: encode a first portion of a first packet to indicate a spatial reuse opportunity with a transmission of a first packet; encode the first portion to indicate a basic service set (BSS) packet of the wireless device; and cause to be transmitted the first packet.

In Example 44, the subject matter of Example 43 can optionally include where the first portion comprises a legacy physical (PHY) header, and wherein the operations further configure the wireless device to: encode a service field of the legacy PHY header to indicate the spatial reuse opportunity.

In Example 45, the subject matter of Examples 43 or 44 can optionally include where the first portion comprises a legacy media access control (MAC) header, and wherein the operations further configure the wireless device to: encode a reserved bit or bits in a high-throughput (HT) control field or a reserved bit or bits in a very high-throughput (VHT) control field of the legacy MAC header to indicate the spatial reuse opportunity.

In Example 46, the subject matter of any of Examples 43-45 can optionally include where the first portion is to comprise a subfield that indicates that the first packet is available or not available for the spatial reuse opportunity.

Example 47 is an apparatus of a first access point (AP), the apparatus comprising: means for encoding a first portion of a first packet to indicate a spatial reuse opportunity with a transmission of a first packet; means for encoding the first portion to indicate a basic service set (BSS) packet of the wireless device; and means for causing to be transmitted the first packet.

In Example 48, the subject matter of Example 47 can optionally include where the first portion comprises a legacy physical (PHY) header, and further comprising: means for encoding a service field of the legacy PHY header to indicate the spatial reuse opportunity.

In Example 49, the subject matter of Examples 47 or 48 can optionally include where the first portion comprises a legacy media access control (MAC) header, and further comprising: means for encoding a reserved bit or bits in a high-throughput (HT) control field or a reserved bit or bits in a very high-throughput (VHT) control field of the legacy MAC header to indicate the spatial reuse opportunity.

In Example 50, the subject matter of any of Examples 47-49 can optionally include where the first portion is to comprise a subfield that indicates that the first packet is available or not available for the spatial reuse opportunity.

In Example 51, the subject matter of any of Examples 47-50 can optionally include means for transmitting and receiving radio frequency signals.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a high-efficiency (HE) station (STA), the apparatus comprising:
    processing circuitry; and
    memory coupled to the processing circuitry,
    the HE-STA configured for overlapping basic service set (OBSS) preamble detection based spatial reuse operation, the processing circuitry configured to:
    decode a first physical layer convergence procedure (PLCP) protocol data unit (PPDU);
    determine when the first PPDU is an inter-BSS PPDU, received from an OBSS, based on a BSS color indicated in a header of the first PPDU or a BSSID indicated in the first PPDU;
    determine when a spatial reuse subfield in an HE signal field (HE-SIG) of the first PPDU is set to indicate that spatial reuse is prohibited;
    determine when a received signal strength level, measured from a preamble of the first PPDU, is below a threshold;
    encode a second PPDU for transmission; and
    generate signalling to cause the second PPDU to be transmitted before an end of the first PPDU, when the first PPDU is determined to be an inter-BSS PPDU, when the spatial reuse subfield is not set to indicate that spatial reuse is prohibited, and when the received signal strength level is below the threshold.

2. The apparatus of claim 1, wherein the processing circuitry is further configured to: generate signalling to cause the second PPDU to be transmitted after the end of the first PPDU when the first PPDU is not determined to be an inter-BSS PPDU; when the spatial reuse subfield is set to indicate that spatial reuse is prohibited; or when the received signal strength level is not below the threshold.

3. The apparatus of claim 1, wherein when the second PPDU is permitted to be transmitted before the end of the first PPDU, the processing circuitry is further configured to cause the STA to perform a clear-channel assessment (CCA) before the end of the first PPDU prior to transmission of the second PPDU.

4. The apparatus of claim 3 wherein the second PPDU is a spatial reuse PPDU.

5. The apparatus of claim 4, wherein the processing circuitry is configured to:
    wait a backoff window duration; and
    perform the CCA after the backoff window duration,
    wherein when the CCA indicates a clear channel, cause to be transmitted the second PPDU concurrently with reception of at least a portion of the first PPDU.

6. The apparatus of claim 1, wherein for transmission of the second PPDU before the end of the first PPDU, the processing circuitry is further configured to adjust a transmit power for transmission of the second PPDU, based on the received signal strength level measured from a preamble of the first PPDU.

7. The apparatus of claim 1, wherein the first PPDU and the second PPDU are uplink packets for transmission to an access point.

8. The apparatus of claim 1, wherein the first PPDU is received within a transmission opportunity (TXOP) acquired by an access point, and wherein and the second PPDU is transmitted with the TXOP.

9. The apparatus of claim 1, wherein the processing circuitry comprises a baseband processor.

10. The apparatus of claim 9 further comprising transceiver circuitry coupled to the processing circuitry, the transceiver circuitry configured to be coupled to two or more antennas.

11. A non-transitory computer-readable storage medium that stores instructions for execution by processing circuitry of a high-efficiency station (HE ST A), the HE-STA configured for overlapping basic service set (OBSS) preamble detection based spatial reuse operation, the processing circuitry configured to:
    decode a first physical layer convergence procedure (PLCP) protocol data unit (PPDU);
    determine when the first PPDU is an inter-BSS PPDU, received from an OBSS, based on a BSS color indicated in a header of the first PPDU or a BSSID indicated in the first PPDU;
    determine when a spatial reuse subfield in an HE signal field (HE-SIG) of the first PPDU is set to indicate that spatial reuse is prohibited;
    determine when a received signal strength level; measured from a preamble of the first PPDU, is below a threshold;
    encode a second PPDU for transmission; and
    generate signalling to cause the second PPDU to be transmitted before an end of the first PPDU, when the first PPDU is determined to be an inter-BSS PPDU, when the spatial reuse subfield is not set to indicate that spatial reuse is prohibited, and when the received signal strength level is below the threshold.

12. The computer-readable storage medium of claim 11, wherein the processing circuitry is further configured to:
    generate signalling to cause the second PPDU to be transmitted after the end of the first PPDU when the first PPDU is not determined to be an inter-BSS PPDU;

when the spatial reuse subfield is set to indicate that spatial reuse is prohibited; or when the received signal strength level is not below the threshold.

13. The computer-readable storage medium of claim 11, wherein when the second PPDU is permitted to be transmitted before the end of the first PPDU, the processing circuitry is further configured to cause the STA to perform a clear-channel assessment (CCA) before the end of the first PPDU prior to transmission of the second PPDU.

14. The computer-readable storage medium of claim 13 wherein the second PPDU is a spatial reuse PPDU.

15. The computer-readable storage medium of claim 14, wherein the processing circuitry is configured to:
    wait a backoff window duration; and
    perform the CCA after the backoff window duration,
        wherein when the CCA indicates a clear channel, cause to be transmitted the second PPDU concurrently with reception of at least a portion of the first PPDU.

16. The computer-readable storage medium of claim 11, wherein for transmission of the second PPDU before the end of the first PPDU, the processing circuitry is further configured to adjust a transmit power for transmission of the second PPDU, based on the received signal strength level measured from a preamble of the first PPDU.

17. A method for overlapping basic service set (OBSS) preamble detection based spatial reuse performed by processing circuitry of a high-efficiency station (HE STA), the method comprising:
    decoding a first physical layer convergence procedure (PLCP) protocol data unit (PPDU),
    determining when the first PPDU is an inter-BSS PPDU, received from an OBSS, based on a BSS color indicated in a header of the first PPDU or a BSSID indicated in the first PPDU;
    determining when a spatial reuse subfield in an HE signal field (HE-SIG) of the first PPDU is set to indicate that spatial reuse is prohibited;
    determining when a received signal strength level, measured from a preamble of the first PPDU, is below a threshold;
    encoding a second PPDU for transmission; and
    generating signalling to cause the second PPDU to be transmitted before an end of the first PPDU, when the first PPDU is determined to be an inter-BSS PPDU, when the spatial reuse subfield is not set to indicate that spatial reuse is prohibited, and when the received signal strength level is below the threshold.

18. The method of claim 17, further comprising:
    generating signalling to cause the second PPDU to be transmitted after the end of the first PPDU when the first PPDU is not determined to be an inter-BSS PPDU; when the spatial reuse subfield is set to indicate that spatial reuse is prohibited; or when the received signal strength level is not below the threshold.

19. The method of claim 17, wherein when the second PPDU is permitted to be transmitted before the end of the first PPDU, the method further comprising configuring the STA to perform a clear-channel assessment (CCA) before the end of the first PPDU prior to transmission of the second PPDU.

20. The method of claim 19 wherein the second PPDU is a spatial reuse PPDU.

* * * * *

UNITED STATES PATENT AND TRADEMARK OFFICE
CERTIFICATE OF CORRECTION

PATENT NO. : 10,244,555 B2  
APPLICATION NO. : 15/890792  
DATED : March 26, 2019  
INVENTOR(S) : Huang et al.

Page 1 of 1

It is certified that error appears in the above-identified patent and that said Letters Patent is hereby corrected as shown below:

In the Claims

In Column 15, Line 65, in Claim 2, after "to:", insert --¶--

In Column 16, Line 34, in Claim 10, after "claim 9", insert --,--

In Column 16, Line 40, in Claim 11, delete "(HE ST A)," and insert --(HE STA),-- therefor In Column 16, Line 53, in Claim 11, delete "level;" and insert --level,-- therefor In Column 16, Line 63, in Claim 12, after "The", insert --non-transitory--

In Column 17, Line 4, in Claim 13, after "The", insert --non-transitory--

In Column 17, Line 10, in Claim 14, after "The", insert --non-transitory--

In Column 17, Line 10, in Claim 14, after "claim 13", insert --,--

In Column 17, Line 12, in Claim 15, after "The", insert --non-transitory--

In Column 17, Line 19, in Claim 16, after "The", insert --non-transitory--

In Column 17, Line 30, in Claim 17, delete "(PPDU)," and insert --(PPDU);-- therefor In Column 18, Line 29, in Claim 20, after "claim 19", insert --,--

Signed and Sealed this  
Twelfth Day of May, 2020

Andrei Iancu  
*Director of the United States Patent and Trademark Office*